(12) United States Patent
Wilson

(10) Patent No.: US 7,926,774 B1
(45) Date of Patent: Apr. 19, 2011

(54) CLAMPING DEVICE

(76) Inventor: Lyndon E. Wilson, Noxon, MT (US)

( * ) Notice: Subject to any disclaimer, the term of this patent is extended or adjusted under 35 U.S.C. 154(b) by 0 days.

(21) Appl. No.: 12/008,866

(22) Filed: Jan. 14, 2008

Related U.S. Application Data

(60) Provisional application No. 60/880,102, filed on Jan. 12, 2007.

(51) Int. Cl.
A47B 96/06 (2006.01)
(52) U.S. Cl. ............. 248/229.14; 248/231.71; 248/539; 248/229.24; 248/228.5; 248/230.5; 248/231.61; 248/187.1; 248/181.1
(58) Field of Classification Search ............ 248/231.71, 248/539, 229.14, 229.24, 228.5, 230.5, 231.61, 248/187.1, 181.1
See application file for complete search history.

(56) References Cited

U.S. PATENT DOCUMENTS

| | | | | |
|---|---|---|---|---|
| 311,731 A * | 2/1885 | Ege | ................................ | 248/539 |
| 589,261 A * | 8/1897 | Koch | ............................ | 248/514 |
| 1,132,554 A * | 3/1915 | Brett | ......................... | 248/229.14 |
| 2,586,636 A * | 2/1952 | Fischer et al. | .................... | 269/4 |
| 3,643,902 A * | 2/1972 | Gualano | ......................... | 248/539 |
| 4,039,178 A * | 8/1977 | Odames | ........................... | 269/75 |
| 4,094,497 A * | 6/1978 | Stratton | ........................... | 269/71 |
| 4,573,655 A | 3/1986 | Vulic | | |
| 4,586,221 A | 5/1986 | Wu | | |
| 5,431,364 A * | 7/1995 | Etter | .............................. | 248/514 |
| 5,441,225 A * | 8/1995 | Hall | ......................... | 248/231.61 |
| 5,779,118 A * | 7/1998 | Douglass | ....................... | 224/407 |
| 6,142,437 A * | 11/2000 | Wilkins, Jr. | .............. | 248/231.71 |
| 6,293,449 B1 * | 9/2001 | McGuire et al. | .............. | 224/420 |
| 6,305,654 B1 * | 10/2001 | Schmidt et al. | ........... | 248/231.61 |
| 6,758,449 B1 * | 7/2004 | Chen et al. | ..................... | 248/146 |
| 6,962,314 B2 * | 11/2005 | Hsu | .................. | 248/205.5 |
| 2003/0080267 A1 * | 5/2003 | Eslick | ......................... | 248/229.1 |
| 2003/0146364 A1 * | 8/2003 | Gates et al. | ................... | 248/534 |
| 2004/0211868 A1 * | 10/2004 | Holmes et al. | ............ | 248/231.71 |
| 2006/0278785 A1 * | 12/2006 | Wiesner et al. | ........... | 248/231.71 |

FOREIGN PATENT DOCUMENTS

GB    2 220 767 A    1/1990

OTHER PUBLICATIONS www.clamperpod.com; Calcutta, OH.

* cited by examiner

Primary Examiner — Anita M. King
Assistant Examiner — Nkeisha J Smith
(74) Attorney, Agent, or Firm — Jean Kyle

(57) ABSTRACT

A universal clamp allows a camera to be positioned at a variety of angles and then secured for a steady shot. A docking member supports the camera through its universal docking port. A positioning member is connected to the docking member at 90°. The position member engages an attachment member that is used to affix the clamp to an environmental support. A securing member locks all parts once the camera is in position.

4 Claims, 3 Drawing Sheets

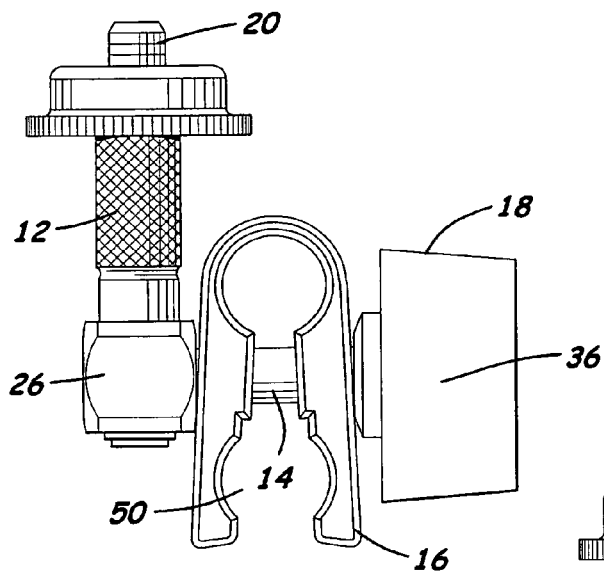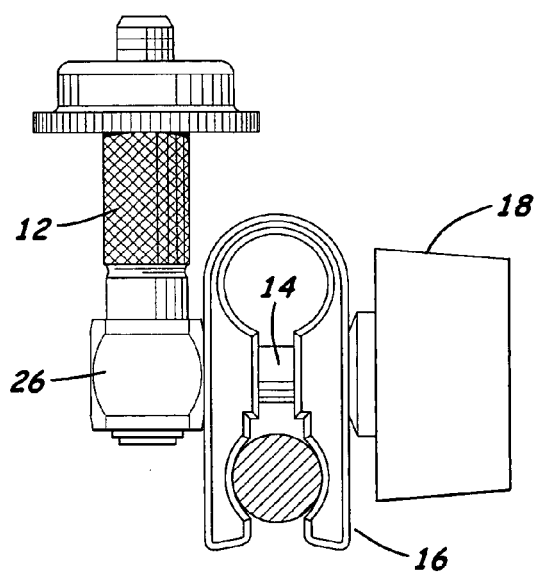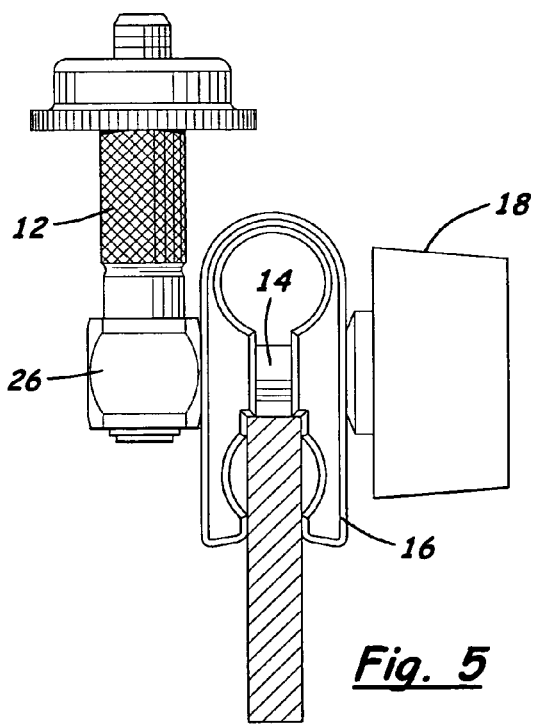
Fig. 3
Fig. 4
Fig. 5

CLAMPING DEVICE

CROSS-REFERENCE TO RELATED APPLICATIONS

This application claims the benefits of U.S. Provisional Patent Application No. 60/880,102, filed Jan. 12, 2007, the disclosure of which is hereby incorporated by reference in its entirety including all figures, tables and drawings.

BACKGROUND OF THE INVENTION

Photography has always been a popular hobby. The advent of digital photography has given new life to this pastime allowing more people to participate. Only a computer is required to manipulate photos, not expensive developing facilities. Whether digital or conventional photographs are being taken it is important the camera be supported securely and steadily. Numerous clamps have been described that could be used to hold cameras and other optical devices (see, for example, U.S. Patent Application No. 2003/0080267 A1, U.S. Pat. Nos. 4,573,655; and 4,586,221, UK Patent Application No. GB 2 220 767 A, see also, www.clamperpod.com). There remains a need however for a clamp that can be positioned in a variety of ways and then secured tightly to allow any photographer to get that perfect shot and retain the ability to be part of the photograph by using the camera's built-in timer.

All patents, patent applications, provisional patent applications and publications referred to or cited herein, are incorporated by reference in their entirety to the extent they are not inconsistent with the teachings of the specification.

SUMMARY OF THE INVENTION

The clamp of the subject invention can be adjusted in various positions then secured to provide steady support for a camera. The clamp comprises a docking member connected to a positioning member at about a 90° angle. A support attachment member connects to the positioning member and allows the clamp to be attached to environmental supports. The attachment member moves about and around the positioning member to allow final positioning of the camera before it is locked in position by a securing member.

BRIEF DESCRIPTION OF THE DRAWINGS

FIG. 3 is a side elevational view of a preferred embodiment of the clamping device of the subject invention.

FIG. 4 is a side elevational view of a preferred embodiment of the clamping device of the subject invention attached to a cylindrical object.

FIG. 5 is a side elevational view of a preferred embodiment of the clamping device of the subject invention attached to a planar object.

DETAILED DESCRIPTION OF THE INVENTION

A clamping device provides maximum adjustability while providing secure support for a camera. The device is both compact and lightweight.

Figure 1:
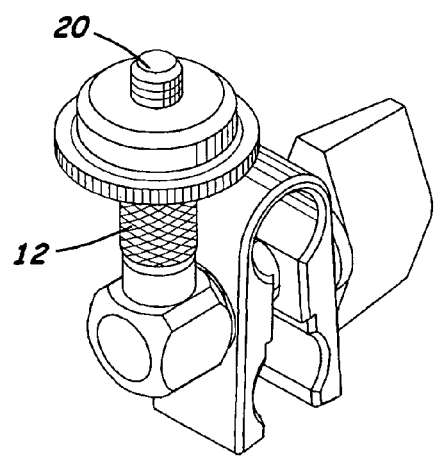
FIG. 1 is a front perspective view of a preferred embodiment of the clamping device of the subject invention.
Figure 2:
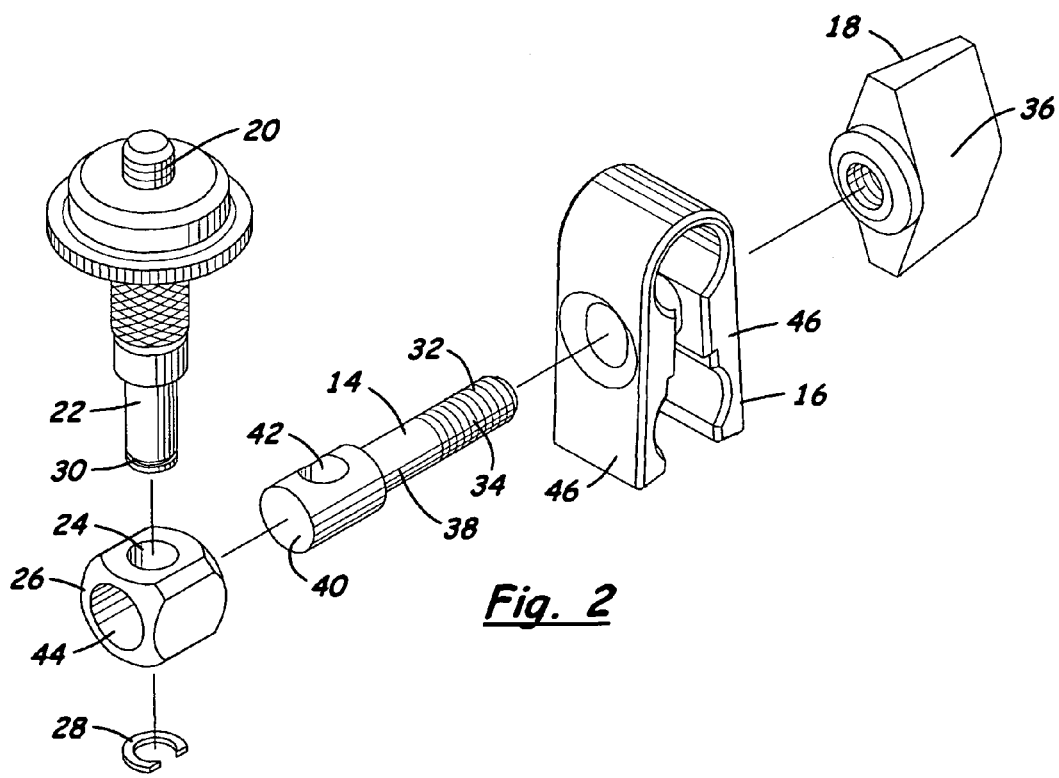
FIG. 2 is an exploded view of FIG. 1.
Figure 6:
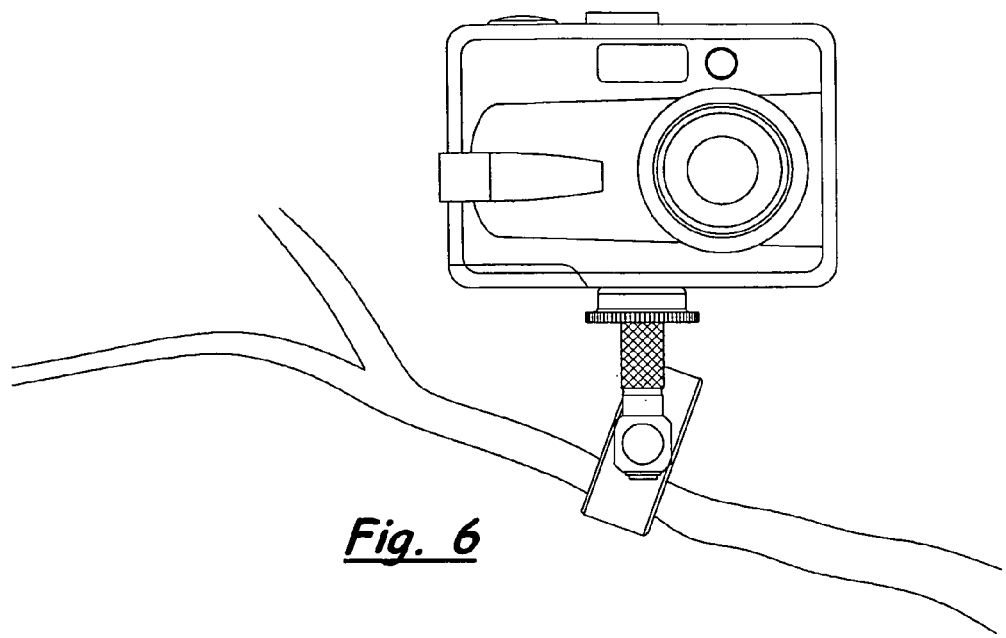
FIG. 6 is an environmental view of a preferred embodiment of the clamping device of the subject invention attached to a tree branch.
Figure 7:
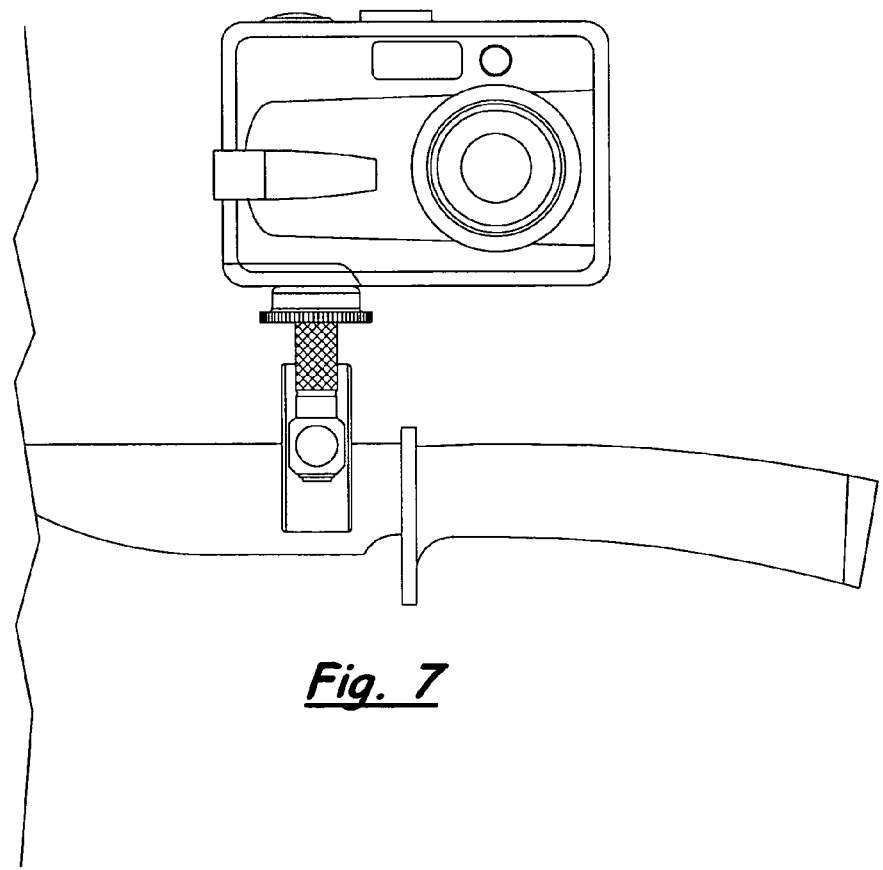
FIG. 7 is an environmental view of a preferred embodiment of the clamping device of the subject invention attached to a knife blade.

A preferred embodiment of the clamping device of the subject invention is shown generally in FIGS. 1-7. The device comprises a docking member 12 to support an object (i.e. a camera), a positioning member 14, an attachment member 16 to attach the clamp to a surface and a securing member 18.

In the exemplified embodiment, components are simple to provide a strong, easy to use device. One skilled in the art would realize however that, for example, clamp type or means for fastening one component to the next could be substituted and still achieve a positioning device that can be locked by a single securing member.

In the exemplified embodiment, the device rotates in six directions. The docking member rotates relative to the positioning member. The attachment member rotates relative to the positioning member and the attachment member rotates relative to the surface. In the embodiment shown in the appended figures, the docking member is disposed at one end of the positioning member. The docking member is at about a 90 degree angle to the positioning member. A spring action attachment member is disposed along the positioning member and the securing member is disposed at an end of the positioning member opposite the docking member. Once the camera is suitably positioned relative the surface by rotating the device, rotation is locked by the securing member which presses the spring attachment member to hold the surface and locks the docking member in position relative to the positioning member. Specifically, the docking member 12 is threaded to receive the universal docking port of a camera. It can be rotated while being connected to the camera by a joint that holds the positioning member at 90 degrees. The positioning member 14 is threaded on one end to receive the securing member 18, while at the opposite end it is connected to the docking member. The attachment member 16 slips over the positioning member to allow central rotation at a right angle to the positioning member and permits union to round or flat objects from parallel to perpendicular positioning to the docking member. The securing member fixes the six position rotation determined by the docking member and the attachment member and locks the unit securely in position.

In a preferred embodiment, the docking member has means to receive a camera, specifically, it has ¼-20 thread 20 to accommodate the universal docking port of a camera or camcorder. The docking member can however be configured to accommodate other equipment, for example, laser levels or surveying equipment, also thread size can be altered to accommodate changing docking standards. In the exemplified embodiment, preferably, a larger knurled diameter is included on the member for hand securing the member to the universal docking port. Opposite the universal docking threads is a machined diameter 22 that engages a slightly larger hole 24 precisely centered and perpendicular to the flat side of a connection cube 26. The connection cube is a preferred means by which to dispose the docking member and the positioning member at about 90°. A fastening snap ring 28 engages a groove 30 in the docking member to secure the docking member to the cube. Although a connection cube is exemplified, one skilled in the art would recognize that there are other means suitable to position these members at about 90 degrees including, but not limited to, a spherical connector, and an L-shaped bracket.

The positioning member 14 is connected to the docking member at about a 90° angle. In the exemplified embodiment, the positioning member is configured at one end 32 to be affixed to the attachment member 16 by the securing member 18. The positioning member is machined with threads 34 to be secured with a tee knob or thumb nut 36. From this thread, a similar diameter 38 is machined that allows the attachment member 16 to rotate and slide about the positioning member 14. Opposite the end to be secured to the securing member, the end 40 is configured to slip fit into the connecting cube 20. A centered hole 42 in the positioning member aligns with a hole 44 in the cube to allow the docking member to be slipped through the positioning member and the cube forming a connective joint at about 90 degrees.

A preferred embodiment of the attachment member 16 is shown in the exemplified embodiment. In this embodiment, the attachment member 16 is generally rectangular having bifurcated arms 46. The thickness of the member, at least in one section, is sufficient to receive the positioning member. As the positioning member is secured to the attachment member by the securing member, a hinged clamping effect either accommodates union with a desired diameter on the closed side of the member, or provides spring action on the open end of the member to capture flat or round objects. In the exemplified embodiment, the arms form at least one open cylinder 50. This cylinder can be used to capture round supports like a mirror support on an all terrain vehicle, or a tree branch. A flange at both ends of the cylinder allow the attachment means to capture and hold flat objects as well, such as a knife blade, a car window, or a fence post (see FIGS. 6 and 7).

In the exemplified embodiment, the securing member is a tee knob or thumb nut to threadably engage the positioning member. One skilled in the art however is aware that these members can be secured in other ways that allow the positioning member and the docking member to be rotated and slide then be secured relative to the attachment member. The securing member provides one locking mechanism for all moving parts. In the exemplified embodiment, the securing member works in conjunction with the connecting cube to lock rotation of the docking member within the positioning member.

The clamping device of the exemplified embodiment is highly adjustable, compact and weighs slightly more than one AA battery. Its simple construction and ease of use make it an invaluable tool for any photographer. The stability with which the subject clamp holds the camera allows the photographer to become part of the picture by positioning the camera, securing the clamp and then setting the camera's timing device. It is noted that although described as a photographer's clamp, the device of the subject invention can be used in any application were flexibility in positioning and a secure connection are required.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:

1. A clamp to position an object relative to a surface, the clamp comprising:
 a docking member to support the object;
 a positioning member disposed at about a 90 degree angle to the docking member a securing member to apply linear force to the positioning member;
 an attachment member disposed along the positioning member to secure the clamp to the surface, the attachment member a single piece comprising bifurcated arms to capture said surface when drawn together, and wherein said docking member is disposed at about 90 degrees to one end of said positioning member and said securing member is disposed at another end of said positioning member and said attachment member is disposed on said positioning member therebetween;
 a connecting means to receive the docking member and to receive the positioning member and to position said docking member at about 90 degrees to said positioning member and to lock the docking member in position relative to the positioning member when linear force is applied to the positioning member; and
 wherein the object is positioned relative to the surface by rotating the docking member relative to the positioning member, rotating the attachment member relative to the positioning member and rotating the attachment member relative to the surface, and when the object is in a suitable position, locking the object in the suitable position with the securing member.

2. A clamp to position an object relative to a surface, the clamp comprising:
 a docking member to support the object;
 a positioning member disposed at about a 90 degree angle to the docking member, wherein said docking member is secured within said positioning member by a snap ring;
 an attachment member disposed along the positioning member to secure the clamp to the surface, the attachment member a single piece comprising bifurcated arms to capture said surface when drawn together;
 a connecting means to receive the docking member and to receive the positioning member and to position said docking member at about 90 degrees to said positioning member and to lock the docking member in position relative to the positioning member when linear force is applied to the positioning member; and
 a securing member to apply linear force to the positioning member;
 wherein the object is positioned relative to the surface by rotating the docking member relative to the positioning member, rotating the attachment member relative to the positioning member and rotating the attachment member relative to the surface, and when the object is in a suitable position, locking the object in the suitable position with the securing member.

3. A clamp for positioning an object relative to a surface, the clamp comprising:
 a docking member comprising one end and another end, the one end comprising means to receive the object, said another end comprising a groove;
 a positioning member disposed at about 90 degrees to the docking member, the positioning member comprising a hole near one end to receive the docking member and threads at another end, wherein the docking member extends through the hole in the positioning member and is secured in the positioning member by a snap ring placed in the groove of the docking member;
 an attachment member disposed along the positioning member near the threaded end of the positioning member, the attachment member a single piece comprising bifurcated arms to capture said surface when drawn together;
 a connecting means to receive the docketing member and to receive the positioning member and to position said docking member at about 90 degrees to said positioning member and to lock the docking member in position relative to the positioning member when linear force is applied to the positioning member; and
 a securing member engaging the threads on said another end of the positioning member to apply linear force to the positioning member;
 wherein the object is positioned relative to the surface by rotating the docking member relative to the positioning member, rotating the attachment member relative to the positioning member and rotating the attachment member relative to the surface, and when the object is in a suitable position, locking the object in the suitable position with the securing member.

4. The clamp of claim 3, wherein said connecting means is a connecting cube.

\* \* \* \* \*